Figure 1:
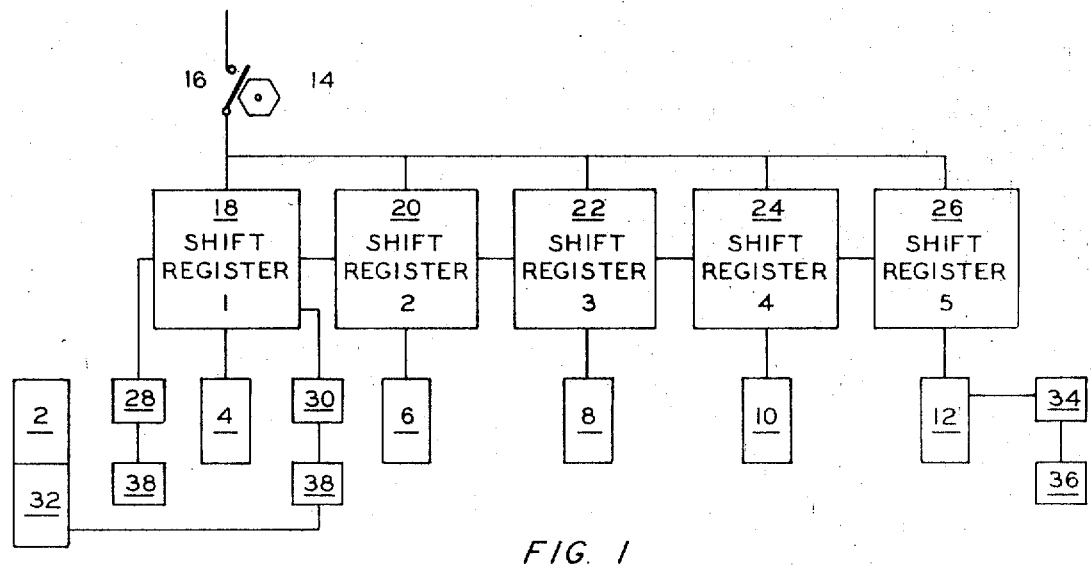

United States Patent

[11] 3,599,198

[72] Inventor Melvin R. Harrell
 Kansas City, Mo.
[21] Appl No. 868,827
[22] Filed Oct. 23, 1969
[45] Patented Aug. 10, 1971
[73] Assignee Phillips Petroleum Company

[54] CONTROL SYSTEM FOR MULTIFUNCTIONING MACHINE
 5 Claims, 3 Drawing Figs.
[52] U.S. Cl. ............................................. 340/267,
 29/33 P, 235/92 SH, 235/151, 340/259
[51] Int. Cl. ............................................. G08b 21/00
[50] Field of Search ............................................. 340/267,
 309.1, 309.3, 309.4, 309.5; 235/151, 151.1, 929
 A, 92 O; 214/11 AST; 29/33 D; 53/53

[56] References Cited
UNITED STATES PATENTS
2,985,835 5/1961 Stuart ............................ 214/11 AST UX
3,082,871 3/1963 Duncan ......................... 340/213 Q UX
3,379,863 4/1968 Werts ........................... 235/92 UX
3,508,242 4/1970 Kamberg et al. ............. 340/309.1

Primary Examiner—John W. Caldwell
Assistant Examiner—Perry Falan
Attorney—Young and Quigg ABSTRACT: An improved control system comprising a plurality of shift registers associated with sensing means and machine components of a multifunctioning machine for interrupting the operation of a machine component in response to a signal indicating a prior malfunctioning machine component.

INVENTOR.
M. R. HARRELL
BY Young & Quigg
ATTORNEYS

INVENTOR.
M. R. HARRELL

CONTROL SYSTEM FOR MULTIFUNCTIONING MACHINE

This invention relates to a control system for a multifunctioning machine. In another aspect, this invention relates to a control system for controlling the separate operational functions of a plurality of differently constructed machine components relative to the operation of the other machine components of a multifunctioning machine.

Many heretofore utilized multifunctioning machines were constructed with no automatic shutdown or selective control systems. It was therefore necessary to visually observe the operation of each component of the machine and, in the event of malfunction of any component, manually stop the machine and reject the malformed article. Later sensing means and automatic shutdown systems were employed to avoid the necessity for personal supervision. In these improved machines control systems were installed which periodically, automatically examined the articles being formed by the multifunctioning machine. In the event one of the machine components malfunctioned, the machine was shutdown, an alarm rang and personnel would manually correct the difficulty. The improved system caused difficulties in the situation where other manufacturing or processing machines were dependent upon the multifunctioning machine to deliver a constant supply of articles or material. In these cases, the interruption of material supplied to secondary equipment caused by malfunction of the multifunctioning machine interrupted the entire process or manufacturing production line.

Studies on the malfunctions of machine components disclosed that in many situations a malfunctioning machine component was self-correcting and, had the machine been allowed to continue operation, the subsequent cycle of that malfunctioning component would have operated satisfactorily. Continued operation could be easily accomplished by removing the improvement installed thereon, but the system would have returned to the original form and visual supervision would be necessary to prevent monumental waste in the event the malfunction was not self-correcting. Examples of a multifunctioning machine for which the apparatus of this invention is particularly applicable are: Composite container forming machines, such as ice cream containers, milk cartons, and the like; machines manufacturing leather goods; machines manufacturing complex metal parts; and the like.

It is therefore an object of this invention to provide an improved control apparatus for a multifunctioning machine. Another object of this invention is to provide an improved control apparatus, of the above described type, that will permit substantially continuous operation of the multifunctioning machine in the event of malfunction of one of the machine components. Yet another object of this invention is to provide an improved control apparatus, of the above described type, which will obstruct the performance of subsequent operations on a malformed article or material owing to the faulty operation of one of the machine components thereby conserving energy, materials, and supervision expenditures. A further object of the improved control apparatus of the above described type is to provide means which will examine the frequency of machine component malfunctions and deliver a warning signal in situations where the malfunctioning component does not automatically correct itself and machine maintenance is necessary. Other aspects, objects, and advantages of the present invention will become apparent from a study of the disclosure, the appended claims, and the drawing.

Figure 3:
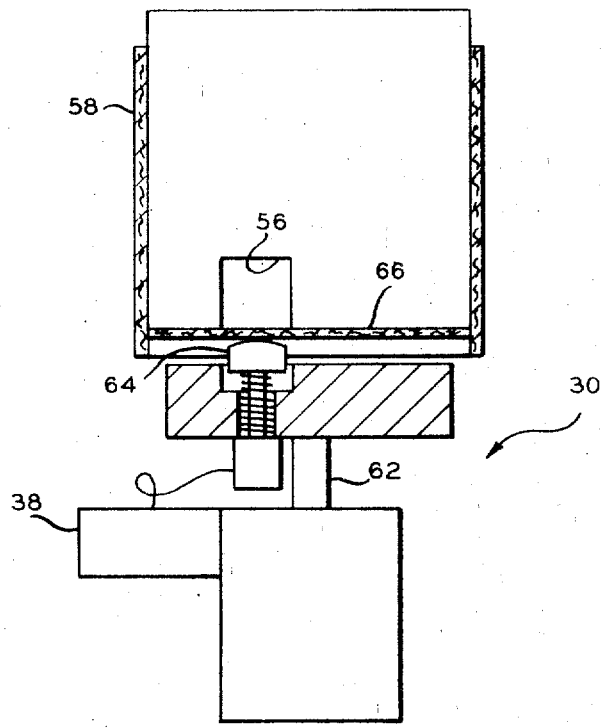
Figure 2:
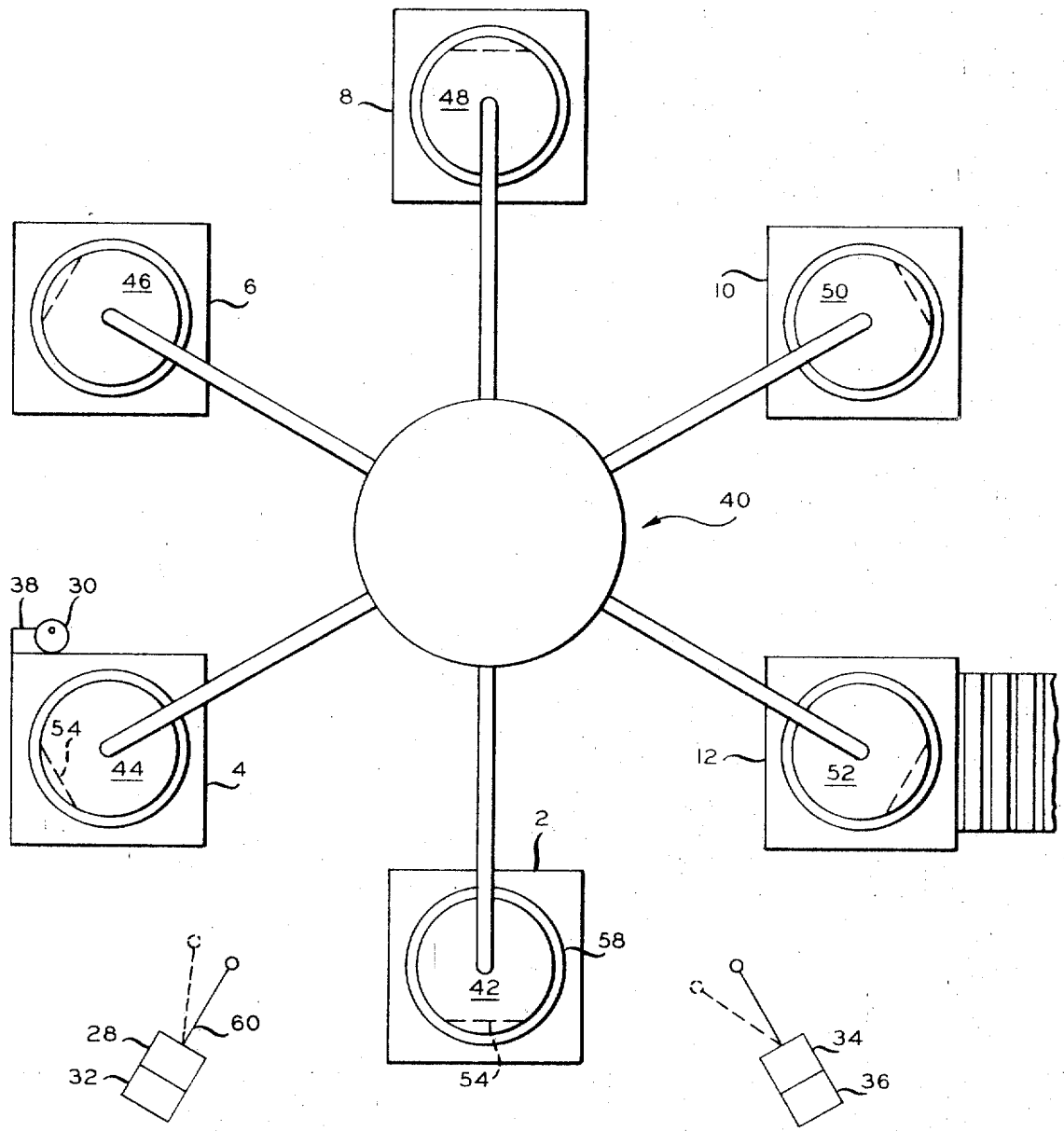

In the drawing, FIG. 1 comprises a single figure diametrically representative of the control apparatus of this invention. Although the control apparatus of this invention can be utilized on a multitude of different types of multifunctioning machines, each comprising a plurality of different machine components as previously described, an ice cream carton manufacturing machine with its associated machine components will be utilized, for example purposes, throughout the following description. FIG. 2 is a diagrammatic view of turret and the sensing means. FIG. 3 is a diagrammatic view of a bottom disc sensing means.

Referring to FIG. 1, a plurality of differently functioning, individual, separate, consecutively positioned machine components 2, 4, 6, 8, 10, 12 comprise portions of the multifunctioning machine. A portion of the machine components are separately connected to an individual, consecutively positioned shift-register 18, 20, 22, 24, or 26. Each shift-register is serially connected to the preceding shift-register and to a separate, individual machine component, and preferably has hermetically sealed dry reed switches for improved functioning in detrimental atmosphere. An example of a shift register containing dry reed switches can be found under Catalog No. 1612L—T11S24 of the Allen-Bradley Co., 136 W. Greenfield Ave., Milwaukee, Wisconsin. First, second, and third sensing means 28, 30, and 34 are each associated with a separate machine component and connected to that component's shift-register for sensing a malfunction of the associated machine component and delivering a signal in response to a detected malfunction. It is preferred that alarm, counteralarms or machine stop switches be connected to each sensing means. All shift-registers 18, 20, 22, 24, and 26 are connected to a switch 16 having a cam 14 for intermittently actuating said registers at preselected intervals in response to the closing of said switch by the cam. For example, the cam is connected to a turret (not shown) having a plurality of mandrels (not shown), each mandrel consecutively movable to a position adjacent a different machine component upon receipt of an indexing signal. Departure of the mandrels from the operating positions causes cam 14 to close switch 16, actuate the shift-register to transfer any received signal to the next shift-register. A sidewall feeder 32 is associated with the first machine component 2 and to the second sensing means 30 for supplying sidewall blanks to said first machine component 2. In this example, it is preferred that a counteralarm 38 be connected to the first and second sensing means 28, 30 and a machine stop-switch 36 be connected to the third sensing means 34.

Referring to FIG. 2, a turret 40 having a plurality of mandrels 42, 44, 46, 48, 50, and 52 intermittently indexes a mandrel adjacent consecutively positioned machine components 2, 4, 6, 8, 10, and 12. Each mandrel has a side groove 54 and a bottom opening 56 (better seen in FIG. 3). A first and third sensing means 38, 34 are positioned in the pathway of the mandrels. A sidewall 58 is placed over a mandrel by machine component 2. As that mandrel is indexed to a position adjacent machine component 4, the sidewall contacts the actuating arm 60 of sensing means 28 and moves said actuating arm thereby indicating that a sidewall has been installed on the mandrel. In the absence of a sidewall, the actuating arm passes through the groove of the mandrel and causes a signal to be delivered from the sensing means to the first shift-register 18. The third sensing means 34 is constructed similar to the first sensing means 28 and is positioned adjacent machine component 12 to indicate a malfunction of that machine component.

FIG. 3 shows the second sensing means 30 that is associated with the second machine component 4. An elevator means 62 braces feeler 64 into contact with the bottom disc 66 of the container and depresses feeler 64 thereby preventing a signal from being delivered to the second shift-register 20. If machine component 4 does not install a disc on the container, feeler 64 passes into the bottom opening 56 of the mandrel and causes a signal to be delivered to the second shift register 20.

In the operation of the improved control means of this invention a side wall feeder delivers a carton sidewall blank to the first machine component 2. The first machine component 2 wraps the blank around the adjacent first mandrel and heat seals the overlapping edges. The first sensing means 28 thereafter is actuated to determine the presence or absence of the sidewall on the mandrel. As here constructed, the first sensing means delivers no signal if a sidewall is present, but delivers a signal to the first shift-register 18 if the sidewall is absent. It should be understood that the improved control means of this invention can be constructed to control the operation of a machine component upon either the absence or the presence of a received signal. In this example, the machine components automatically operate and one cycle of their operation is interrupted by a received signal.

Upon turret indexing to move each mandrel to the next succeeding station, cam 14 is actuated to momentarily close switch 16 and any signal received by a shift-register is at that time transferred to the following shift register.

First considering a normal operation, the first mandrel now containing sidewall is indexed to the next station adjacent the second machine component 4. The first machine component 2 functioned properly in forming the sidewall of the first mandrel and that fact was verified by the first sensing means 28 which in response to said correctly formed side wall delivered no signal to the first shift-register 18. Since the first shift-register had no interrupting signal to deliver to its associated second machine component 4, then said second machine component 4 normally actuates to insert a bottom disc on the sidewall that is mounted on the first mandrel. In the example turret machine a second mandrel has been indexed adjacent the first machine component 2 and at this time is receiving a sidewall. The second sensing means 30 thereafter is actuated to determine the presence or absence of the bottom disc on the sidewall that is positioned on the first mandrel. The switch is thereafter actuated by movement of the mandrels to a new position which actuates the shift registers to deliver any received signal to the next succeeding shift-register. Since, in normal operation the disc is correctly inserted, no signal is delivered by the second sensing means 30 to the first shift-register 18. On indexing the s second shift-register 20 receives no signal from the first shift-register 18 and therefore permits its associated third machine component 6 to heat the bottom disc and the sidewall that is positioned on the first mandrel. At that time, under normal operation, the second mandrel is receiving a bottom disc and the third mandrel of the turret is receiving a sidewall.

Thereafter, the first mandrel is automatically, periodically indexed to a position adjacent the fourth machine component 8 where the sidewall is crimped and sealed to the bottom, thereafter to the fifth machine component 10, which is indicated as an "open" machine component for example purposes, and thereafter to a position adjacent the sixth machine component 12. There being no malfunctions, the machine component receives no signal from its associated fifth shift-register and thereafter said sixth machine component operates to extract the carton from the first mandrel. The third sensing means 34 thereafter verifies that said carton has in fact been extracted.

It should be understood that the number of sensing means employed can be increased or decreased, the number of mandrels or part holding means can be increased or decreased, and the number of machine components can be increased or decreased. In the example, the fourth shift-register 24 and its associated fifth machine component 10 have been designated "open" to emphasize the fact that the plurality of stations, parts, and operations can be varied without departing from the invention.

In order to more fully understand the control features of this invention, it is necessary to consider a situation where the first machine component 2 malfunctions and does not correctly install a sidewall on the adjacent mandrel. Where there is an incorrectly installed sidewall or no sidewall, the first sensing means 28 delivers a signal to the first shift-register 18 which, in turn, prevents its associated second machine component 4 from operating for one cycle for the installation of a bottom disc on a mandrel having no sidewall present. The shift-registers are actuated by the switch 16 for transferring the signal contained in the first shift register 18 to the second shift-register 20 and relayed to its associated third machine component 6, thereby interrupting one cycle of operation of said third machine component. Thereafter, with each shift of the shift registers in response to actuation of the switch 16, the signal is transferred from a shift-register to the next succeeding shift-register that, in turn, obstructs the operation of its associated machine component on the mandrel containing the malformed carton.

Now consider a situation where a sidewall is correctly installed but the second machine component 4 malfunctions and does not correctly insert a bottom disc. In this situation, the second sensing means 30 delivers a signal to the first shift-register 18 and to the sidewall feeder 32 that supplies the first machine component 2. Each subsequent shift of the mandrel causes the signal to be consecutively shifted to subsequent shift-registers and their associated machine components to prevent one operation cycle of each component on that malfunction carton. Upon arrival of the malformed carton adjacent the sixth machine component 12, the received signal prevents the sixth machine component 12 from extracting the satisfactorily formed sidewall and the third sensing means 34 from determining complete extraction. Subsequent mandrel shifts bring the sidewall covered mandrel adjacent the first machine component 2. A time-delay mechanism contained within the sidewall feeder 32 is calibrated relative to the number of turrets and, in response to the previously received signal, does not deliver a sidewall to the first machine component 2, since a sidewall is present on that particular mandrel. The first sensing means 28 thereafter verifies the correctly installed sidewall and the bottom disc inserter functions to install a bottom disc on the sidewall. That mandrel then proceeds to each operation station as described above.

The third sensing means 34 functions only if and after the sixth machine component 12 has operated to extract the carton from its mandrel. In the situation where component 12 has functioned but the carton was not extracted from the mandrel, the third sensing means 34 preferably delivers a signal, for example, to a machine stopswitch 36 which stops operation of the machine and signals for manual removal of the carton. Since extracting means can easily be constructed that are dependable and positive, this single situation in the example machine that requires manual labor is relatively unimportant. It should be understood that the control means of this invention can be constructed to signal malfunction of the ejector means and pass the mandrel through the machine again to make further automatic attempts to eject the part. However, in the cited example, the signal means has been maintained in a simple form for clarity purposes. Counteralarms 38 or alarms can be installed to signal individual malfunctions or signal the occurrence of a preselected sequence of malfunctions such as, for example, the occurrence of three successive malfunctions.

Utilization of the improved control means of this invention thereby provides continuous operation of a multifunctioning machine in the event of temporary malfunction of one of the machine components, obstructs the operation of machine components on a malformed article, and warns the operator of uncorrected repeating malfunctions. Other modifications and alterations of this invention will become apparent to those skilled in the art from the foregoing discussion and accompanying drawing, and it should be understood that this invention is not to be unduly limited thereto.

What I claim is:

1. An improved control apparatus for controlling the separate operational functions of a plurality of individual, separate, consecutively positioned machine-components associated with a multifunctioning machine, comprising:

sensing means associated with at least one of the machine components for sensing a malfunction of that machine component and delivering a signal in response to a detected malfunction; and a plurality of serially connected shift-registers, at least one of said registers connected to a sensing means and each shift-register connected to a separate, individual machine component for receiving a signal delivered by the sensing means, interrupting the operation of the machine components in response to receiving the signal from the sensing means, and, at preselected intervals, delivering any received signal to a subsequently positioned shift-register.

2. An improved control apparatus, as set forth in claim 1, wherein a shift-register switch having a cam is associated with each shift-register said switch being intermittently actuated at preselected intervals by the cam for delivering a signal from one shift-register to another.

3. An improved control apparatus, as set forth in claim 1, wherein each shift register comprises a hermetically sealed dry reed switch.

4. An improved control apparatus, as set forth in claim 1, including an extractor comprising one of the machine components, a sensing means associated with the extractor for sensing a malfunction of the extractor and delivering a signal in response to a detected malfunction, and a machine stop-switch connected to said extractor sensing means for receiving a signal from the extractor sensing means and terminating operation of the machine in response to the received signal.

5. An improved control apparatus, as set forth in claim 1, including a plurality of sensing means, and a counteralarm separately and individually attached to each of at least a portion of the sensing means for receiving the signals from the sensing means, counting the signals received, and actuating the alarm upon receipt of a preselected sequence of received signals.